United States Patent
Hanson et al.

(10) Patent No.: US 12,243,063 B2
(45) Date of Patent: Mar. 4, 2025

(54) AIOPS AS A CLOUD-BASED SERVICE

(71) Applicant: HEWLETT PACKARD ENTERPRISE DEVELOPMENT LP, Houston, TX (US)

(72) Inventors: Jeff Hanson, Houston, TX (US); Tahir Cader, Liberty Lake, WA (US); Steve Roscio, Monument, CO (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 253 days.

(21) Appl. No.: 17/550,810

(22) Filed: Dec. 14, 2021

(65) Prior Publication Data

US 2023/0186326 A1 Jun. 15, 2023

(51) Int. Cl.
*G06Q 30/0201* (2023.01)

(52) U.S. Cl.
CPC .................. *G06Q 30/0201* (2013.01)

(58) Field of Classification Search
CPC .................................. G06Q 30/0201
See application file for complete search history.

(56) References Cited

U.S. PATENT DOCUMENTS

| | | | |
|---|---|---|---|
| 9,954,972 B2* | 4/2018 | Asenjo | G06Q 10/0637 |
| 10,304,313 B1* | 5/2019 | Moon | G08G 1/0137 |
| 11,455,591 B2* | 9/2022 | Lee | G04F 13/00 |
| 2016/0112283 A1* | 4/2016 | Maturana | G05B 15/02 |
| | | | 709/224 |
| 2018/0367560 A1* | 12/2018 | Mahaffey | H04L 12/4641 |
| 2019/0188737 A1* | 6/2019 | Asenjo | H04L 67/1097 |
| 2020/0182684 A1* | 6/2020 | Yoskovitz | G01R 33/02 |
| 2021/0019682 A1* | 1/2021 | Lee | G06Q 10/06393 |
| 2023/0052612 A1* | 2/2023 | Stoehr | G06F 9/50 |

* cited by examiner

*Primary Examiner* — Dylan C White
(74) *Attorney, Agent, or Firm* — Sheppard Mullin Richter & Hampton LLP

(57) ABSTRACT

Systems and methods are provided for utilizing a bidirectional intermediate data transport layer to connect multiple customers to a shared, cloud-based AIOps service. As a feature of the intermediate data transport layer, each customer (and their data) may be isolated from other customers. In various examples, the cloud-based AIOps service may receive sensor data from customer systems via the intermediate data transport layer. The cloud-based AIOps service may analyze this sensor data (e.g. detect anomalies, perform root cause analyses, find optimal conditions, etc.), and modify the operation of one or more of the customer systems (e.g. modify the settings/configuration of a sensor on a piece of connected infrastructure) via the intermediate data transport layer. In certain examples, in addition to (or instead of) modifying the operation of one or more of the customer systems, the cloud-based AIOps service may provide an on-premises notification to a customer.

21 Claims, 9 Drawing Sheets

AIOPS AS A CLOUD-BASED SERVICE

STATEMENT OF GOVERNMENT RIGHTS

This invention was made under a CRADA (CRD-19-804) between Hewlett Packard Enterprise (HPE) and National Renewable Energy Laboratory (NREL) operated for the United States Department of Energy. The Government has certain rights in this invention.

BACKGROUND

Artificial Intelligence for IT Operations (AIOps) is a fast growing sector in the IT industry. AIOps may refer to the use of artificial intelligence (AI) and machine learning to perform advanced analytics on big data (i.e., time-series data, logs, etc.) for the purposes of anomaly detection, root-cause analyses, and other items. The predictive capabilities of AIOps may also be used to optimize certain tasks/systems: for example, to optimize the energy efficiency of data centers.

Traditionally AIOps services have not been distributed in nature (i.e. they have not been shared among customers). Instead they have been deployed on the premises of individual customers. These individual on-premises deployments have been made to ensure the security of customer data.

BRIEF DESCRIPTION OF THE DRAWINGS

The present disclosure, in accordance with one or more various examples, is described in detail with reference to the following figures. The figures are provided for purposes of illustration only and merely depict examples.

DETAILED DESCRIPTION

Figure 1:
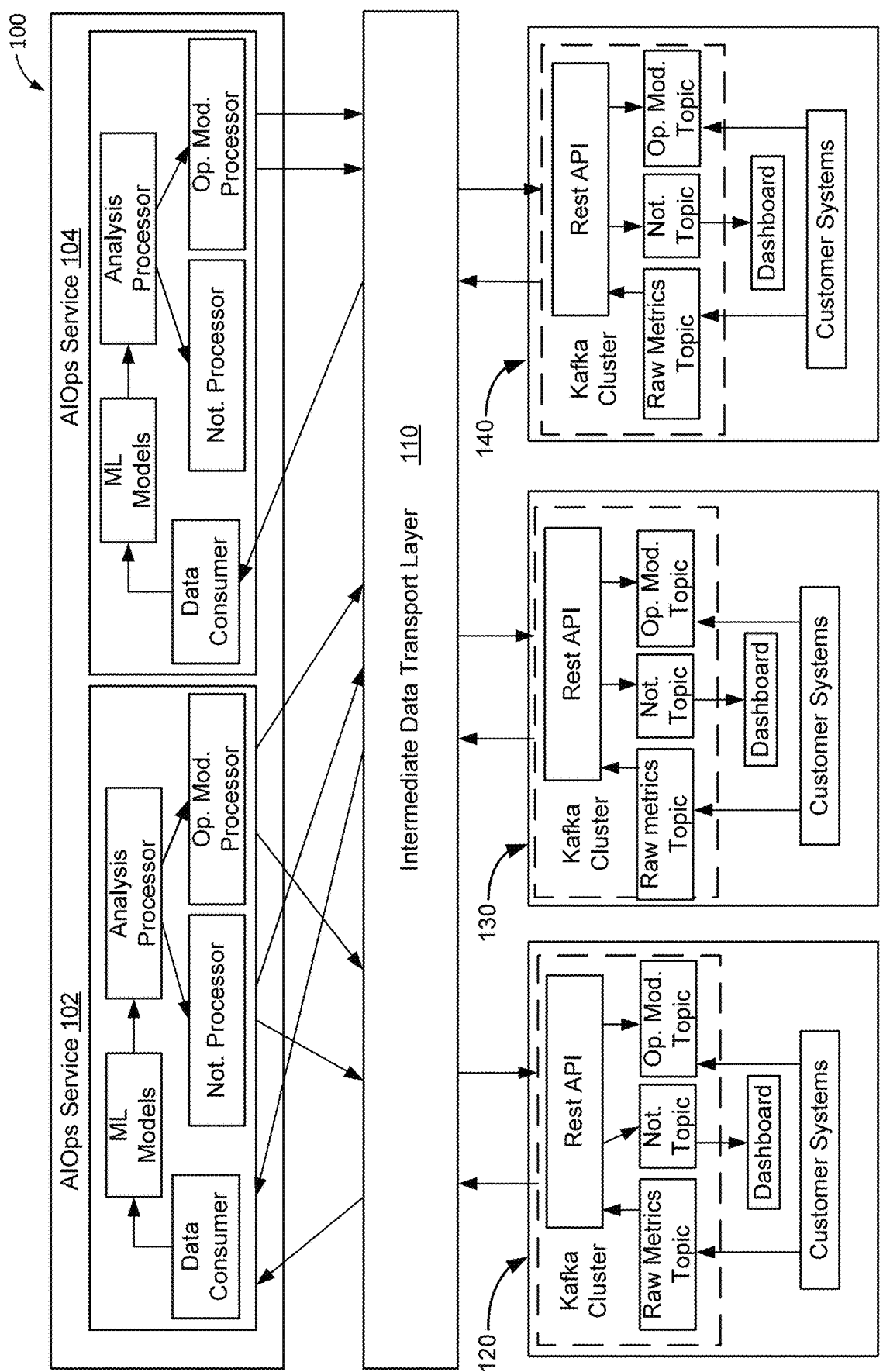
FIG. 1 is a schematic illustrating an example cloud-based deployment of an AIOps service, in accordance with various examples.

As described above, traditionally, AIOps services have not been distributed in nature. Instead they have been deployed on the premises of individual customers. These individual, on-premises deployments have been made to ensure the security of customer data.

However, these on-premises deployments have certain drawbacks. In particular, they are unable to leverage insights from one customer site, and apply them in real-time to benefit other customers. For example, an AIOps service deployed at a first customer site may find a sub-optimal condition for a temperature sensor on a coolant distribution unit. A second customer may have the same make/model coolant distribution unit, with the same sub-optimal temperature sensor condition. Because the AIOps service deployed at the first customer site is unconnected to the second customer, the learnings derived at the first customer site cannot be leveraged in real time to benefit the second customer.

One way to dynamically leverage AIOps-based insights at multiple customer sites would be to provide AIOps as a cloud-based service. Using this approach, multiple customers may share data with a shared/common cloud-based AIOps service. Accordingly, the shared AIOps service could dynamically leverage insights derived at one customer site to benefit other customers. Extending the example from the previous paragraph, a cloud-based AIOps service could send a notification related to the sub-optimal temperature sensor condition detected at the first customer site, to any customer which has the same/similar model coolant distribution unit.

However, a cloud-based approach like this has been limited by the conventional methods by which customers (and/or their systems) connect to cloud-based services. Typically, these conventional methods (e.g. Websocket, IPsec, and similar connections) involve a direct connection between the customer and the cloud-based service. These conventional (typically direct) connection methods do not provide the level of security that many data sensitive customers (e.g. National Labs, military customers, etc.) demand for data driven services like AIOps.

For example, WebSocket connections between customers and cloud-based services have known authentication and authorization weaknesses, and lack an integrated identity system leaving them susceptible to spoofing. Other conventional connection techniques such as IPsec connections operate at too low a level, which can result in the joining of customer networks, despite even the best efforts of a cloud-based service provider. Accordingly, these types of connections are not acceptable to data sensitive customers.

Against this backdrop, examples of the presently disclosed technology utilize a bidirectional intermediate data transport layer (e.g. HPE's Remote Device Access technology) to connect multiple customers to a shared, cloud-based AIOps service. As a feature of the intermediate data transport layer, customers (and the data they provide to the AIOps service) may be fully isolated from each other. Accordingly, examples of the presently disclosed technology are able to dynamically leverage AIOps-based insights across multiple customer sites, while maintaining robust data security.

In various examples, the cloud-based AIOps service may receive sensor data from customer systems via an intermediate data transport layer which connects the cloud-based AIOps service to multiple customers. This intermediate data transport layer may provide these connections while maintaining data isolation. Accordingly, the cloud-based AIOps service may analyze this sensor data (e.g. detect anomalies, perform root cause analyses, find optimal conditions, etc.), and modify the operation of one or more of the customer systems (e.g. modify the settings/configuration of a sensor on a piece of connected infrastructure) via the intermediate data transport layer. In certain examples, in addition to (or instead of) modifying the operation of one or more of the customer systems, the cloud-based AIOps service may provide an on-premises notification to a customer. These notifications may inform the customer about the operation of their system(s). For example, a notification may inform a customer to an anomalous operation of an air pressure sensor in one of its critical machines.

As described above, the intermediate data transport layer which connects the cloud-based AIOps service to multiple customers may be a layered communication platform such as HPE's Remote Device Access platform ("RDA"). This layered communication platform may utilize "Midway Servers" ("midways") and data transport "tunnels" to establish secure pipelines between customers and the cloud-based AIOps service. For example, a midway (which may be a piece of computer hardware or software) may act as an intelligent switchboard which joins a first data transport tunnel that leads to a customer with a second data transport tunnel that leads to the AIOps service.

In various examples, the intermediate data transport layer may offer a publish/subscribe message bus communications link between a midway and the cloud-based AIOps service. Via the midway and this publish/subscribe message bus communications link, a customer may publish messages to the AIOps service on certain topics (e.g. raw metrics/sensor data topics), which the AIOps service may be pre-subscribed to read/receive. As will be described below, all of these messages may be visible to the AIOps service only. Via this link and the midway, the AIOps service may also publish messages back to customers on certain topics (e.g. notifications and operational modification topics) which a customer (or its systems) may be pre-subscribed to read/receive. In this way, multiple customers may share data with a common cloud-based AIOps service, which in turn can apply insights derived from a given customer's data to benefit multiple customers. As will be described in greater detail below, this is all achieved in a manner which keeps customers (and their data) isolated from each other.

FIG. 1 is a schematic illustrating an example cloud-based deployment of an AIOps service.

The example deployment includes cloud platform 100 and customers 120, 130, and 140. Intermediate data transport layer 110 connects each customer to cloud platform 100 (and the AIOps services which reside within it) in a manner which isolates customers (and their data) from each other.

Cloud Platform and AIOps Services: Cloud platform 100 may be any cloud platform capable of providing a public/distributed cloud-based AIOps service. For example, cloud platform 100 may be HPE's Greenlake cloud platform. In certain embodiments, cloud platform 100 may be a public cloud platform. In other embodiments, cloud platform 100 may be a "hybrid" cloud platform which has certain aspects of a public cloud platform, and certain aspects of a private cloud platform. For example, a hybrid cloud platform may combine an on-premises data center with public cloud services.

Residing within cloud platform 100 are AIOps services 102 and 104. An AIOps service may refer to a service which utilizes artificial intelligence and/or machine learning to perform analytics on data for the purposes of anomaly detection, root-cause analyses, optimizing tasks/customer systems, and other items. In certain examples, AIOps services 102 and 104 may be different versions of an AIOps service offered by an AIOps service provider. For example, AIOps service 102 may be a premium service which costs more money to subscribe to than AIOps service 104. In another example, the two AIOps services may be tailored for different customer applications. For example, AIOps service 102 may be tailored to perform analytics for energy sector customers/applications, while AIOps service 104 may be tailored to perform analytics for data centers. While there are only two AIOps services depicted in the example figure, in other examples a service provider may provide any number of AIOps services based on price, application type, etc.

Customers: Customers 120 and 130 subscribe to AIOps service 102, and customer 140 subscribes to AIOps service 104. As used herein, a customer may refer to any individual or entity which subscribes to an AIOps service. A customer may occupy various sectors. For example, customers 120 and 130 may occupy the energy sector. By contrast, customer 140 may operate a data center. While only three customers are depicted in the example of FIG. 1, in other examples many additional customers may subscribe to an AIOps service. Accordingly, the AIOps service may apply insights derived from one customer's data to benefit other customers. Said differently, a given customer may benefit from insights derived from other customers' data in real-time.

As depicted, a given customer may have customer systems and a customer Kafka cluster.

Customer Systems: Customer systems may refer to the connected devices and infrastructure systems of a customer, and may include both hardware and software systems. For example, if customer 120 operates a nuclear power plant, customer 120's customer systems may include all of the connected devices and infrastructure systems of the power plant (e.g. nuclear reactors, coolant distribution units, computing/software systems, etc.).

Customer Kafka Clusters: A customer's Kafka cluster may be a software communication bus which uses stream-processing to facilitate communication between a given customer's customer systems and external systems (e.g. AIOps services 102 and 104) via an intermediate data transport layer. As depicted, a customer's Kafka cluster may connect to intermediate data transport layer 110 in various ways. For example a customer Kafka cluster may connect to intermediate data transport layer 110 using either a customer initiated or a service provider initiated TLS/TCP connection. In certain examples, these connections may be made over IPSec. In other examples, a customer may connect to an interface of intermediate transport layer 110 via a REST API using JSON or Avro.

By any of these methods, a customer can connect to an intermediate data transport layer (such as intermediate data transport layer 110) with little to no modification of their Kafka cluster. Accordingly, the customer may subscribe to one of the cloud-based AIOps services depicted without having to retool its systems. In this way, AIOps services 102 and 104 may be provided in a customer-friendly, modular fashion. Moreover, because of the unique features of intermediate transport layer 110 (which will be described in greater detail in conjunction with FIG. 4), all of this is achieved in a data secure manner.

Various topics may reside within a customer's Kafka cluster. These topics may include a raw metrics topic, a notification topic, and an operational modification topic. Here, a topic may refer to a category or a common name used to store and publish a stream of data of a particular type (i.e. raw metric data, notification data, etc.). As described above, a producer may publish data to a topic, and a consumer may read the data from the topic by subscribing to it. For example, the customer systems of customer 120 may publish raw sensor data (e.g. data associated with the operation of a temperature sensor in a coolant distribution unit) to the raw metrics topic which resides in customer 120's Kafka cluster. As will be described below, a data consumer which resides in AIOps service 102 may subscribe to this raw metrics topic via a publish/subscribe message bus communications link of intermediate transport layer 110. By this intermediate link, AIOps service 102 may stream sensor data published by the systems of customer 120 in real-time while customer 120 and its data remain isolated from customers 130 and 140.

Intermediate Data Transport Layer: Intermediate data transport layer 110 may be a bidirectional data transport layer which connects multiple customers to one or more cloud-based AIOps services, while maintaining data isolation between the customers. As described above, intermediate data transport layer 110 can be a layered communication platform such as HPE's Remote Device Access platform (RDA). In various examples, this layered communication platform may use "midways" and data transport "tunnels" to establish secure pipelines between customers and the cloud-based AIOps service. A midway may refer to a piece of computer software or hardware which can join a first data transport tunnel that leads to a customer (e.g. customer 120, 130, or 140) with a second data transport tunnel that leads to an AIOps service (e.g. AIOps service 102 or 104). In this way, a midway may establish a secure, dedicated pipeline between a customer and one of the cloud-based AIOps services.

In various examples, intermediate data transport layer 110 may offer a publish/subscribe message bus communications link between a midway and the cloud-based AIOps services. A publish/subscribe message bus communications link may refer to a communication system/link which allows a sender of messages (i.e. a publisher) to publish messages to one or more topics which a data consumer is subscribed to read/consume. Via the midway and this publish/subscribe message bus communications link, a customer (or its systems) may publish messages to an AIOps service on certain topics (e.g. raw metrics/sensor data topics), to which the AIOps service may be pre-subscribed to consume/receive. As will be described below, all of these messages may be visible to the AIOps service only. Via the publish/subscribe message bus communications link and the midway, the AIOps service may also publish messages back to the customer on certain topics (e.g. notifications and operational modification topics) which the customer's Kafka cluster (or the customer's systems) may be pre-programmed to consume/receive.

In certain examples, JSON or Avro may be used to facilitate communication between intermediate data transport layer 110 and a customer's REST API. Examples of intermediate data transport layer 110 will be described in greater detail in conjunction with FIGS. 4-5.

Topics and Processors: The customer Kafka clusters and AIOps services of FIG. 1 may include various components which publish or subscribe to each other via a publish/subscribe message bus communications link of intermediate transport layer 110. By this communication architecture, AIOps services 102 and 104 may perform real-time analytics for multiple customers, and dynamically leverage insights derived from one customer's data across a larger customer base. Examples of topics and processors which make this possible will be described in greater detail below.

Raw Metrics Topics: Raw sensor data may be published to the raw metrics topic. This raw sensor data may be data associated with the operation of a customer's systems. For example, raw sensor data from one of customer 120's coolant distribution units may be published to the raw metrics topic which resides in customer 120's Kafka cluster. Here, the raw sensor data could include data associated with coolant temperature, coolant pressure, coolant flow rate, power consumption, etc. Raw sensor data may also include data associated with the operation of sensors themselves (e.g. data associated with the operation of a temperature sensor which may indicate that the temperature sensor is malfunctioning/broken).

As illustrated, in certain examples a REST API may serve as an interface between the raw metrics topic and intermediate data transport layer 110. However, in other examples, other interfaces/interface methods may be used.

Notification and Operational Modification Topics: As will be described in greater detail below, an AIOps service may publish to the notification topic and the operational modification topics via the publish/subscribe message bus communications link of intermediate data transport layer 110. In certain examples, the rest API may serve as an interface between intermediate data transport layer 110 and the notification and operational modification topics. Publishing to the operational modification topic of a customer's Kafka cluster is just one of multiple ways that an AIOps service may modify the operations of that customer's systems. Similarly, publishing to the notification topic of a customer's Kafka cluster is just one of multiple ways that an AIOps service may provide a notification to a customer. For example, performance anomalies could be examined by publishing to a Kafka topic that is fed into a database for later use.

An AIOps service may include a data consumer, one or more trained machine learning models, an analysis processor, a notification processor, and an operational modification processor.

Data Consumers: A data consumer may subscribe to the raw metric topics which reside in customer Kafka clusters. Accordingly, the data consumer may read/consume the raw sensor data which customer systems publish to their respective raw metrics topics.

Analysis Processors: Once data is read by the data consumer, the analysis processor may apply analytics to the customer sensor data for various purposes, such as detecting anomalies, performing root cause analyses, optimizing certain tasks/customer systems, etc.

In certain examples, the analysis processor may use one or more trained machine learning models to perform analytics. As will be described in conjunction with FIG. 3, these machine learning models may be trained using historical data extracted from one or more customers. This historical data may relate to past operation of customer systems. For example, the historical data may include information associated with past raw metrics/sensor data, prior detected anomalies, prior root cause analyses, information associated with the optimization of certain tasks/customer systems, prior notifications, prior operational modifications made in response to various analytical insights, etc.

In certain examples, the analysis processor may select one of a plurality of trained machine learning models depending on various factors such as the type of data being analyzed and the type of analysis being performed (i.e. anomaly detection, root cause analysis, optimization, etc.).

For illustration, the analysis processor of AIOps service 102 may be dedicated to anomaly detection. Even for this single type of analysis, the analysis processor may utilize a number of different trained machine learning models. For example, customer 120 may operate a nuclear power plant. Accordingly, the customer systems of customer 120 may include various connected devices/infrastructure systems of the nuclear power plant (e.g. steam turbines, electric generators, nuclear reactors, coolant distribution units, etc.). The analysis processor may utilize separate machine learning models for detecting operational anomalies for each type of connected device/infrastructure system. For example, the analysis processor may utilize a first set of machine learning models to detect operational anomalies in coolant distribution units, and a second set of machine learning models to detect anomalies in nuclear reactors. Various machine learning models in the first set may be trained to detect anomalies for different operational parameters of a coolant distribution unit (e.g. coolant temperature, coolant flow rate, the relationship between coolant temperature and coolant flow rate, etc.). In another example, the analysis processor may utilize machine learning models trained for different operational contexts. For example, the analysis processor may utilize separate machine learning models based on climate (e.g. hot and dry vs. cool and wet), or operational loads (e.g. high vs. low, constant vs. intermittent, etc.).

In summary, the analysis processors which reside in the AIOps services may employ machine learning models which are specifically tailored for various applications. While these machine learning models may be highly tailored, their insights may still be leveraged to benefit a wide customer base. This is due to the distributive capacity of architectures like the one depicted in FIG. 1. Said differently, by providing a secure pipeline for data streaming analytics, a cloud-based AIOps service provider may develop an enormous, and global customer base. Amongst this customer base, insights may be shared while data isolation is maintained. As the size of this customer base increases, the number of generated insights increases as well. Similarly, with a vast customer base, even highly specific insights may benefit multiple customers.

For example, an AIOps service may identify an optimal coolant temperature for a specific model of coolant distribution unit when operated at high intermittent loads at a customer site in Phoenix, AZ (a hot and dry climate). As part of its global customer base, the AIOps service may have a customer in Dubai (another hot and dry climate) which operates the same model coolant distribution units at similar loads. Accordingly, the AIOps service may effectuate an operational modification at each customer site which optimizes coolant temperature based on the analytical insight.

As described above, the analysis processor of a given AIOps service may use one or more trained machine learning models to perform various types of analyses on data from one or more customers (e.g. anomaly detection, root cause analyses, optimization, etc.). In response to this analysis, the AIOps service may determine that either or both of a notification and an operational modification is required.

Notification Processors: For example, a notification processor of an AIOps service may determine that a notification is required, and publish the notification to one or more of the notification topics residing in customer Kafka clusters. As described above, these publications may be carried over a publish/subscribe message bus communications link of intermediate data transport layer 110.

A notification may provide information about an operational condition of a customer system that was analyzed by the analysis processor. For example, one notification may provide information about a detected anomalous operation of a temperature sensor in one of customer 120's coolant distribution units. Another notification may provide information about a predicted failure of an electrical winding in one of customer 120's electrical generators.

As described above, the notification processor may publish a notification which relates to an operational condition analyzed for one customer's systems, to multiple customers. For example, the analysis processor of AIOps service 102 may detect an anomalous operation of a temperature sensor in one of customer 120's coolant distribution units. The notification processor of AIOps service 102 may know that customer 130 has similar coolant distribution units. Accordingly, the notification processor may publish a notification to the notifications topics of customers 120 and 130—even if the analysis processor did not detect an anomalous operation in the coolant distribution units of customer 130.

In certain examples, a customer may have a dashboard which is pre-subscribed to consume messages published to the customer's notification topic. Accordingly, dashboards located on the premises of customers 120 and 130 respectively may be pre-subscribed to consume notification messages published to their customer's notification topic. In this way, personnel at each customer's site may be able to view notifications generated in response to real-time analytical insights made by AIOps service 102.

Operational Modification Processors: An operational modification processor of an AIOps service may determine that an operational modification is required, and publish the operational modification to one or more of the operational modification topics residing in customer Kafka clusters. As described above, these publications may be carried over a publish/subscribe message bus communications link of intermediate data transport layer 110.

An operational modification may modify the operation of a customer system in response to an analytical insight of the analysis processor. This modification may be to either or both of a customer's software and hardware systems. Extending one of the examples from above, the analysis processor of AIOps service 102 may identify an optimal coolant temperature for a specific model of coolant distribution unit when operated at high intermittent loads at customer 120's site in Phoenix, AZ Customer 130 may be located in Dubai (another hot and dry climate), and may operate the same model coolant distribution units at similar loads. Accordingly, the operational modification processor of AIOps service 102 may publish an operational modification based on this analytical insight to the operational modification topics which reside in customer 120 and 130's Kafka clusters. The coolant distribution units of customer 120 and 130 (or some other operational controller) may be pre-subscribed to read from these operational modification topics, and the operations of these systems/devices may be modified accordingly.

Figure 2:
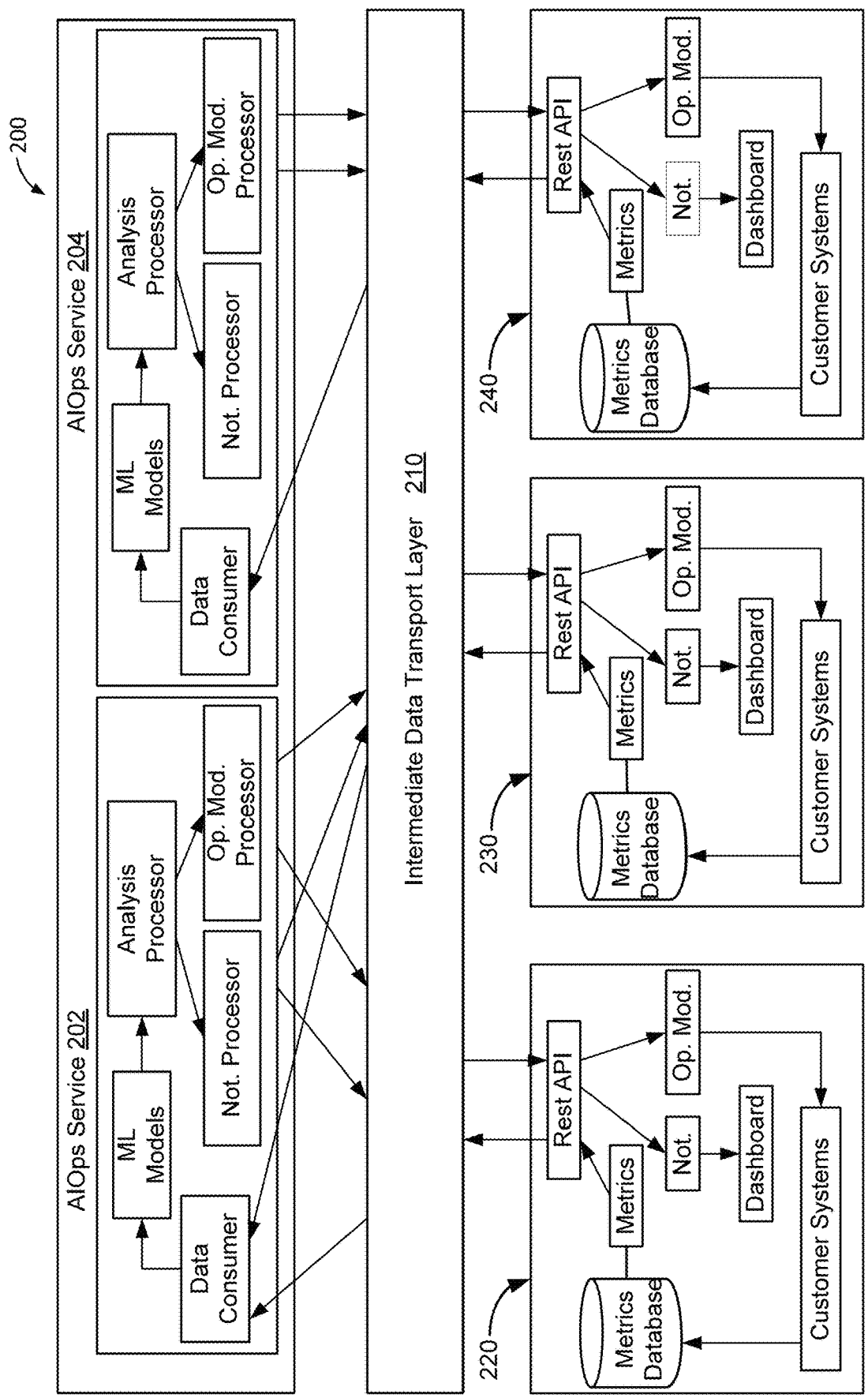
FIG. 2 is another schematic illustrating an example cloud-based deployment of an AIOps service, in accordance with various examples.

FIG. 2 is a schematic illustrating another example cloud-based deployment of an AIOps service.

This example deployment is similar to the deployment described in conjunction with FIG. 1, for example in FIG. 2, platform 200 and customers 220, 230, and 240. Intermediate data transport layer 210 connects each customer to cloud platform 200 (and the AIOps services which reside within it) in a manner which isolates customers (and their data) from each other. Residing within cloud platform 200 are AIOps services 202 and 204. In FIG. 2, instead of a Kafka cluster, this deployment uses a customer's metrics database to extract and transport sensor data from a customer's systems to one or more cloud-based AIOps services. In certain examples, connectors may be used in combination with JSON/Avro to manage data flow between the intermediate data transport layer and each customer's metrics databases. Using this architecture, a customer's investment in their metric database may be leveraged.

Figure 3:
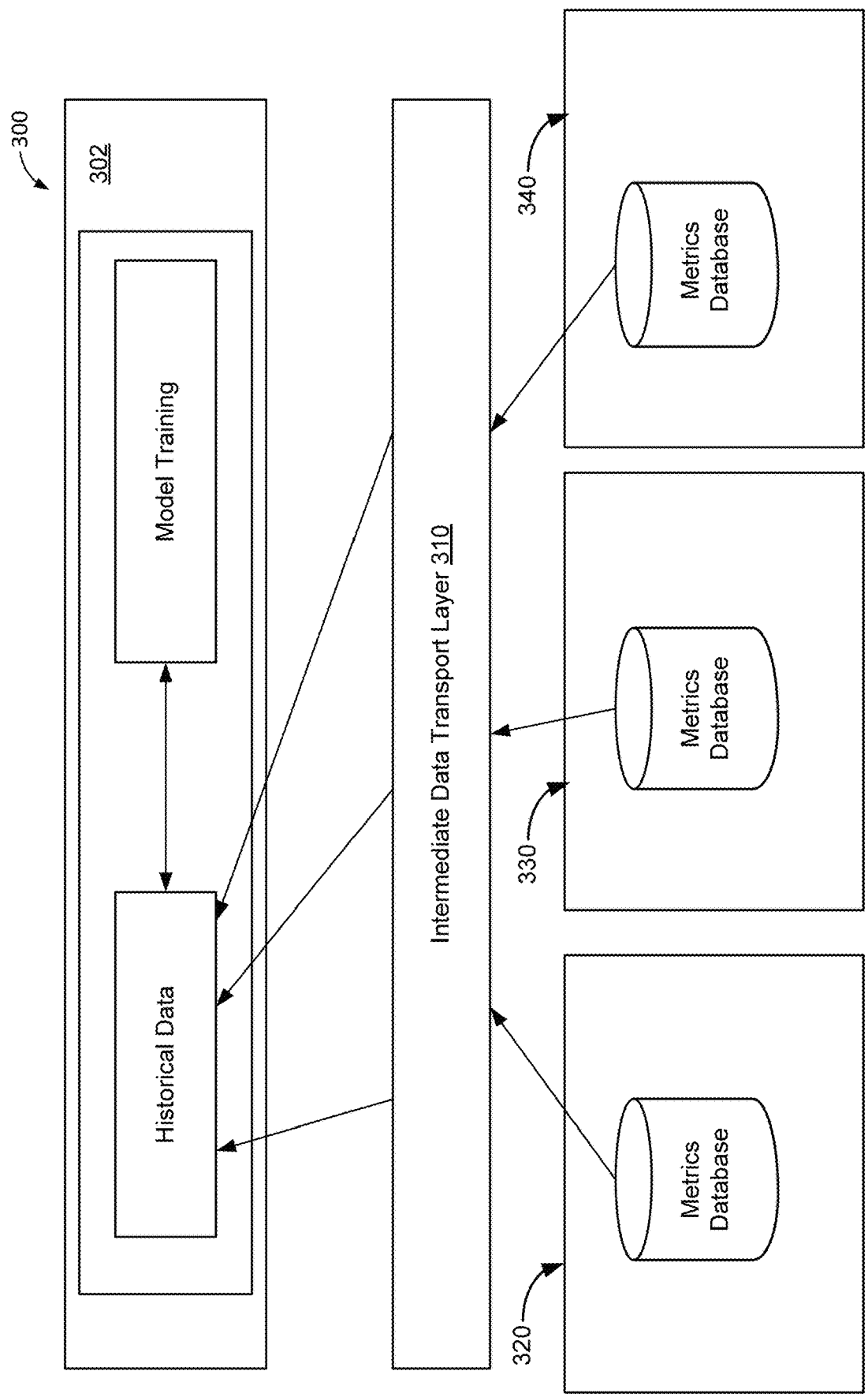
FIG. 3 is another schematic illustrating an example cloud-based deployment of an AIOps service, in accordance with various examples.

FIG. 3 is a schematic illustrating another example cloud-based deployment of an AIOps service. This example deployment is similar to the deployment described in conjunction with FIG. 2, for example in FIG. 3, platform 300 and customers 320, 330, and 340. Intermediate data transport layer 310 connects each customer to cloud platform 300 (and the AIOps services which reside within it) in a manner which isolates customers (and their data) from each other. Residing within cloud platform 300 is model training module 302. In FIG. 3, historical data is extracted for the purposes of offline model training.

As described in conjunction with FIG. 1, machine learning models may be trained using historical data extracted from one or more customers' metrics databases. This historical data may relate to past operation of customer systems. For example, the historical data may include information associated with past raw metrics/sensor data, prior detected anomalies, prior root cause analyses, information associated with the optimization of certain tasks/customer systems, prior notifications, prior operational modifications made in response to various analytical insights, etc.

As depicted, model training module 302 receives historical data from customers 320, 330, and 340. However, in other examples a model training module may receive historical data from any number of customers/customer databases. As described above, by providing a secure pipeline for data streaming analytics, a cloud-based AIOps service provider may develop an enormous, and global customer base. Accordingly, the cloud-based AIOps service provider may be able to extract historical data from a large subset of that customer base for the purposes of model training. With copious data sources, the cloud-based AIOps service provider may be able to train a stable of machine learning models tailored for a variety of customers/customer applications. As these machine learning models consume larger volumes of data (from more numerous/diverse customer applications), they may become more insightful.

Figure 4:
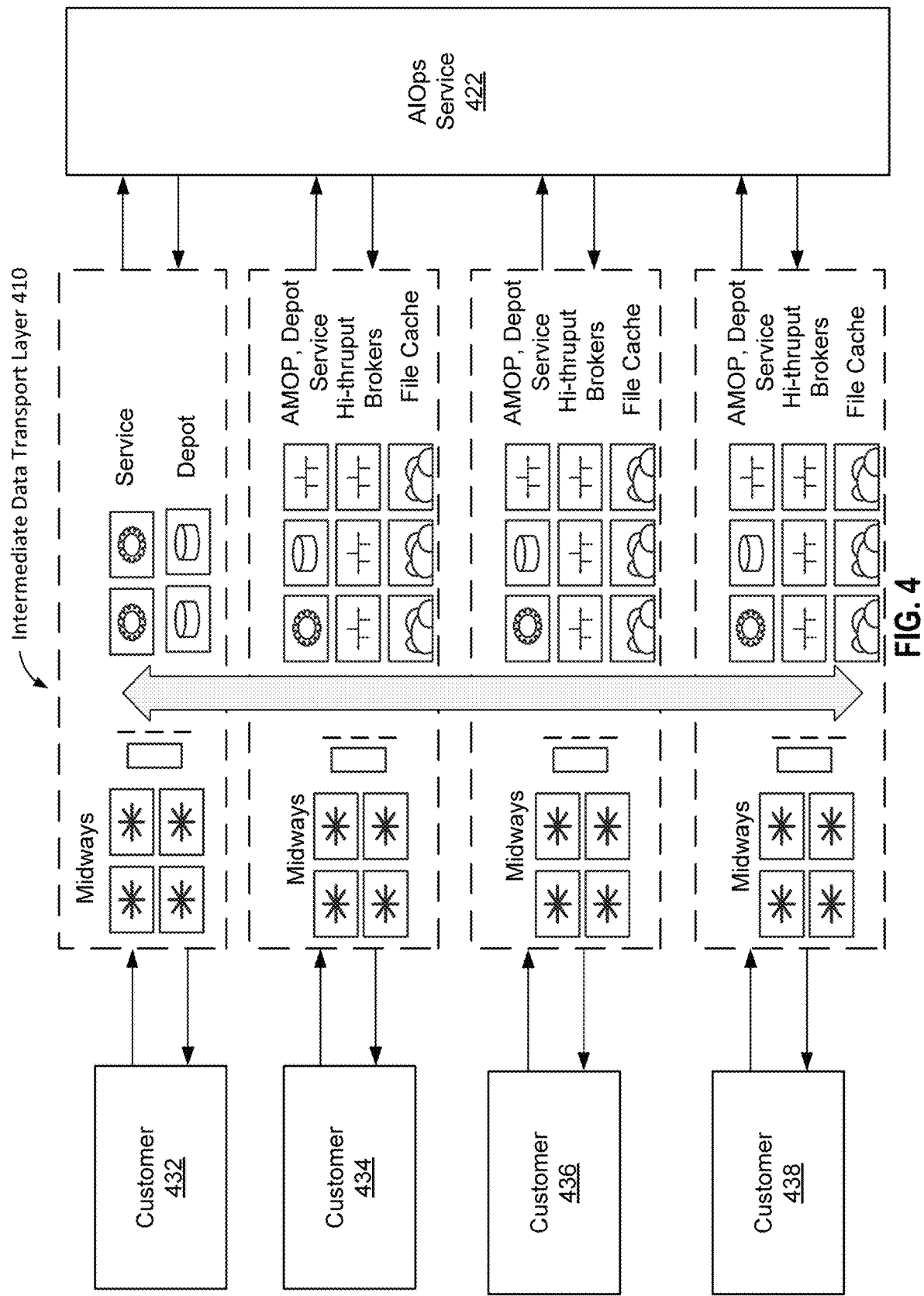
FIG. 4 is a schematic illustrating an intermediate data transport layer, in accordance with various examples

FIG. 4 is a schematic illustrating an intermediate data transport layer, in accordance with various examples. As described above, this intermediate data transport layer may be implemented using HPE's Remote Device Access platform (RDA).

The center of the schematic illustrates intermediate data transport layer 410. The right side of the schematic illustrates cloud-based AIOps service 422. The left side of the schematic illustrates customers 432, 434, 436, and 438.

Intermediate data transport layer 410 may be a bidirectional data transport layer which connects multiple customers to one or more cloud-based AIOps services, while maintaining data isolation between the customers. As depicted, intermediate data transport layer 410 connects customers 432, 434, 436, and 438 to AIOps Service 422.

In various examples, an intermediate data transport layer may be deployed in multiple geographic regions in order to improve availability and disaster tolerance. As depicted, intermediate data transport layer 410 is deployed across 4 geographic regions (represented by the dashed lines), but in other examples an intermediate data transport layer may be deployed across any number of regions.

Each regional deployment of intermediate data transport layer 410 may be comprised of multiple midways, and nodes which support various support and maintenance functions (e.g. service nodes, high throughput broker nodes, file cache nodes, depot nodes, etc.). As will be described below, midways may by pieces of computer software or hardware that act as switchboards which connect a customer to AIOps service 422.

In the example schematic of FIG. 4, AIOps service 422, and each customer (and in certain cases, each of a customer's systems) may be referred to as "stations." As used herein, a station may refer to a publisher or consumer of messages communicated via an intermediate data transport layer.

A station may have a unique identifier, called a station ID. This station ID may be a simple printable string, such as a UUID, a public-DNS hostname, an email address with a location tag, etc. In various examples, all or part of the station ID may be assigned by an entity outside the control of the station in order to guarantee uniqueness. In certain examples, customers may obtain their station ID(s) using an automated registration process. In other examples, customers may obtain station IDs via a registration API.

In certain examples, Station ID's may be cryptographically bound to station identity certificates, such as X.509 certificates. These station identity certificates can be used for authentication of a station. An intermediate data transport layer (e.g. HPE's RDA) may attest the station identity certificates and their associated station identity with a hardware security device, such as a trusted platform module, contained within the station.

As described above, stations (e.g. customers/customer systems, AIOps service 422) may connect with midways, and not each-other, using data transport "tunnels." These data transport tunnels may be viewed as secure pipelines between a station and the midway. Each tunnel may be secured in a variety of ways. For example, a tunnel may require: (1) multiple forms of mutual authentication (e.g. via TLS, ssh, or IPsec); (2) authorization via an access control mechanism; and (3) use of encrypted communications to prevent tampering and eavesdropping (for example, multiple numeric-field-orthogonal encryption methods may be employed to improve resiliency to decryptor attacks). Additional mechanisms (e.g. the maintenance of security keys, tokens, and certificates) may also be used for security.

While stations cannot connect with each other directly, midways may be used to transfer data between stations by joining tunnels. This joining of tunnels may be referred to as a session. A session will be described in greater detail using the following example.

In the example, customer 432 subscribes to AIOps service 422. AIOps service 422 has performed analytics, and has determined that a notification must be sent to customer 432.

To do this, AIOps service 422 (i.e. the session client) may first connect to a midway by establishing, authenticating, and authorizing a tunnel with that midway. Once the tunnel is established, authenticated, and authorized (e.g. using the station ID for AIOps service 422), AIOps service 422 may send a start session request to the midway. In response to the start session request, the midway may perform an authorization check via a session-level access control mechanism. This session-level access control mechanism may consider any number of factors, such as the session client/source station (e.g. AIOps service 422), the destination station (e.g. customer 432), and the activity to be performed (sending/publishing a notification). For example, a midway's authorization check may verify that customer 432 is subscribed to AIOps service 422 (e.g. the authorization check may verify that customer 432's station ID appears on an active subscriber list for AIOps service 422).

If the midway's authorization check is allowed, the midway sends a message down a tunnel to customer 432 (i.e. the destination station) to request that the session be established. Customer 432 may perform a second authorization check of the session request. This customer-side check may verify that AIOps service 422 is a service that customer 432 knows and trusts, that the connection is in a permitted time window, that customer 432 is entitled to this service, and that customer 432 pre-subscribes to notification messages published by AIOps service 422. In certain examples, the customer may manage the customer side authorization check.

If both the midway and customer-side authorization checks pass, then the end-to-end session may be established. All these actions may happen automatically and transparently.

In summary, a "session" may refer to the joining, at a midway, of a first tunnel which leads to an AIOps service with a second tunnel that leads to a customer. Either a customer or an AIOps service may initiate a session by first establishing, authenticating, and authorizing a tunnel to a midway. For example, AIOps service 422 may initiate a session with customer 432 by first establishing/authenticating/authorizing a first tunnel to a midway. Once the first tunnel is established/authenticated/authorized, AIOps service 422 may send a start session request to the midway, requesting to establish a session with customer 432. In response to the start session request, the midway may perform an authorization check to determine whether the session is authorized. If the midway's authorization check passes, customer 432 may perform a second authorization check before the session is established. Accordingly, if both the midway's authorization check and customer 432's authorization check pass, a session may be established between AIOps service 422 and customer 432. Said differently, only if the midway and customer 432 authorize AIOps 422's start session request, will the first tunnel leading to AIOps 422 be joined with a second tunnel leading to customer 432. This multi-faceted authorization/authentication process is part of the reason that intermediate data transport layer 410 can keep customer data secure and isolated. A few additional notes on this authorization/authentication process are described below.

First, this process may be reversed. For example, customer 432 may be the session client/source station, and AIOps service 422 may be the destination station. In this reverse example, similar checks may be performed to authorize each side of the session.

Second, a given customer (and by extension, that customer's systems) may connect with any midway in the world. Accordingly, firmware in a customer's interface with the intermediate data transport layer (and/or in each customer system) may intelligently chose the lowest-latency, highest bandwidth, or other "best" connection path for the customer/customer system. For example, firmware in customer 432's interface may determine that a midway in a first geographic region of intermediate data transport layer 410 is the best connection path for customer 432.

Third, without active authorization from the midway, tunnels may not be joined and/or communicate with each other (in certain examples, each tunnel may run in a separate process, a separate namespace, and separate c-group, further isolating the tunnels from each other). Accordingly, the midways of the illustrated architecture may be viewed as the gatekeepers of the secure "data transport tunnels" which facilitate the transfer of data between a shared cloud-based AIOps service and its plurality of customers.

Figure 5:
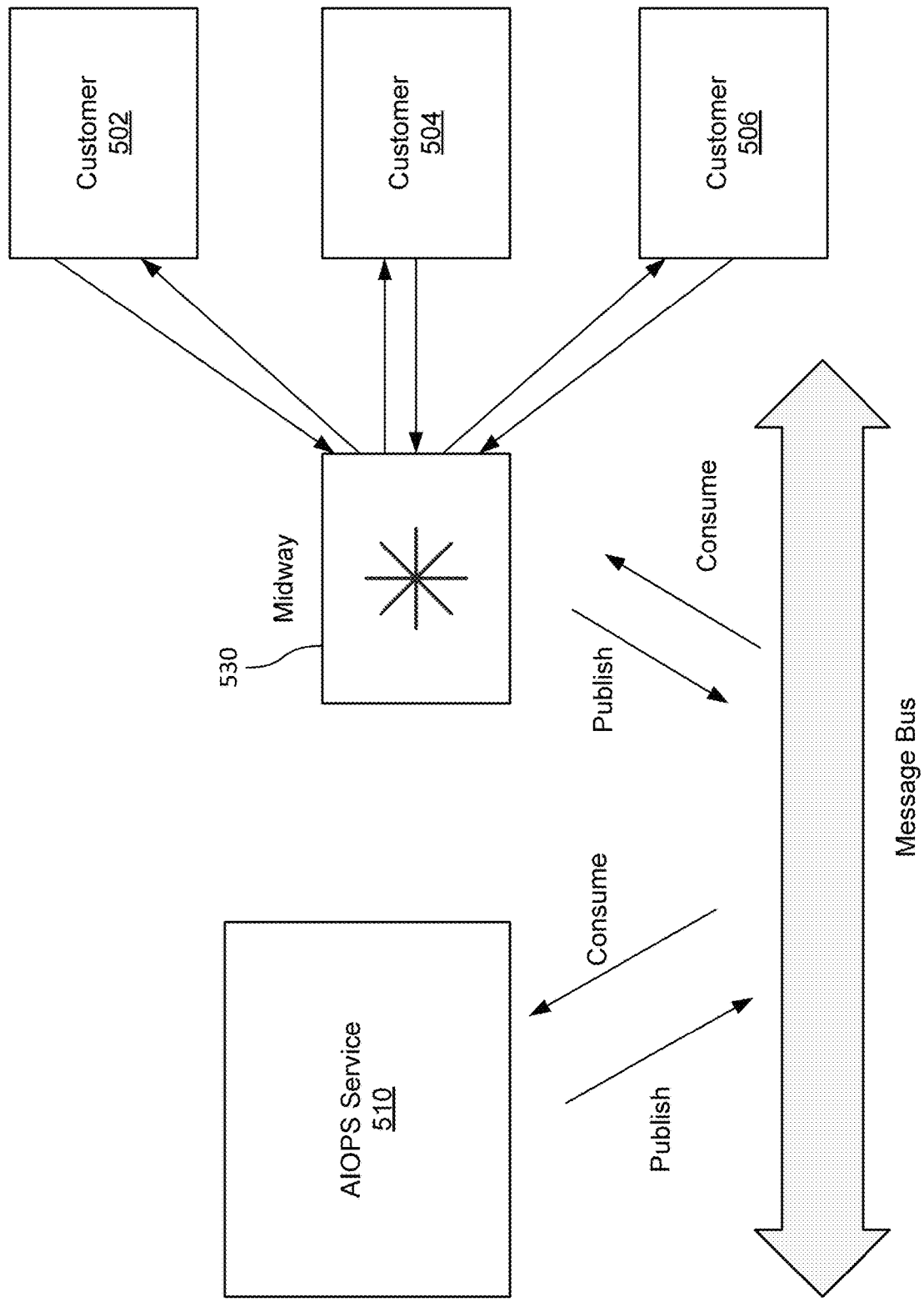
FIG. 5 is a schematic illustrating a publish/subscribe message bus communications link for an intermediate data transport layer, in accordance with various examples.

FIG. 5 is a schematic illustrating a publish/subscribe message bus communications link for an intermediate data transport layer, in accordance with various examples. In certain examples, this publish/subscribe message bus communications link may be a feature of HPE's RDA (as described in conjunction with FIG. 4).

A publish/subscribe message bus communications link may refer to a communication system/link which allows a sender of messages (i.e. a publisher) to publish messages to one or more topics which a data consumer is subscribed to read/consume. In this way, the publish/subscribe message bus communications link may facilitate the transfer of data—in the form of messages—between multiple customers (i.e. customers 502, 504, and 506) and a common AIOps service they subscribe to (i.e. AIOps service 510). Here, the publish/subscribe message bus communications link also includes midways, which operate as switchboards that connects AIOps service 510 to its customers, without connecting the customers to each other (i.e. by this architecture, a given customer/customer environment may never see messages sent by another customer, or messages which are intended for other customers).

For example, AIOps service 510 may determine that a notification must be sent to customers 502 and 506, but not 504 (e.g. the notification may relate to a detected anomaly in the operation of a temperature sensor which is used in machines owned by customers 502 and 506, but not 504). Accordingly, using the publish/subscribe message bus communications link (which may be a tunnel as described in conjunction with FIG. 4), AIOps service 510 may publish relevant notification messages to midway 530. AIOps service 510 may also send a first and second start session request to midway 530, requesting to start sessions with customers 502 and 506 respectively.

As described in conjunction with FIG. 4, in response to a start session request, midway 530 may perform an authorization check by checking a session-level access control mechanism. This session-level access control mechanism may consider any number of factors, such as the session client/source station, the destination station, and the activity to be performed. For example, a first midway authorization check may verify that customer 502 subscribes to notifications messages published by AIOps service 510, and a second midway authorization check may verify that customer 506 subscribes to notifications messages published by AIOps service 510.

If the midway's authorization checks are allowed, the midway may send messages down separate tunnels to customers 502 and 506 respectively, to request that sessions be established. Each customer may perform a second authorization check of the session request. This customer-side check may verify that AIOps service 510 is a service that the customer knows and trusts, that the connection is in a permitted time window, and that the customer pre-subscribes to notification messages published by AIOps service 510. In certain examples, each customer may manage the customer side authorization check.

If both the midway's and the customers' authorization checks pass, separate end-to-end sessions may be established between AIOps 510 and customer 502, and AIOps 510 and customer 506. Accordingly, the notification messages from AIOps service 510 may be published to the notification topics which customer 502 and 506 subscribe to.

As described in conjunction with FIG. 4, this process may be reversed when any of the customers want to publish to a topic which AIOps service 510 subscribes to. For example, customer 504 may want to stream sensor data from its systems to AIOps 510 for the purposes of having analytics performed. Accordingly, customer 504 may establish/authorize/authenticate a tunnel to midway 530, and send a start session request to midway 530, requesting to start a session with AIOps service 510. Assuming that both the midway and AIOps service 510 authorize the start session request, customer 504 can publish messages to a raw metrics topic, which a data consumer which resides in AIOps service 510 maybe pre-subscribed to read.

Figure 6:
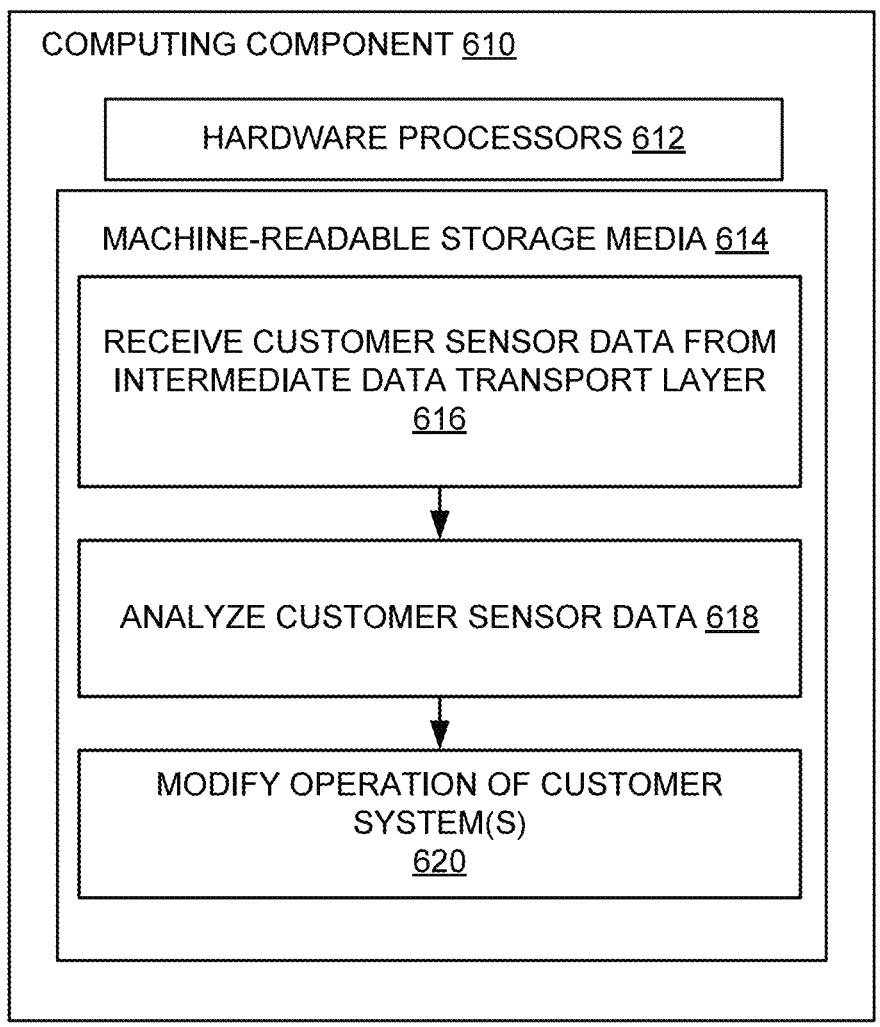
FIG. 6 is an example computing system that may be used to implement a cloud-based AIOps service, in accordance with various examples.

FIG. 6 is an example computing system that may be used to implement a cloud-based AIOps service, in accordance with various examples.

Referring now to FIG. 6, computing component 610 may be, for example, a server computer, a controller, or any other similar computing component capable of processing data. In the example implementation of FIG. 6, the computing component 610 includes a hardware processor 612, and machine-readable storage medium for 614.

Hardware processor 612 may be one or more central processing units (CPUs), semiconductor-based microprocessors, and/or other hardware devices suitable for retrieval and execution of instructions stored in machine-readable storage medium 614. Hardware processor 612 may fetch, decode, and execute instructions, such as instructions 616-620, to control processes or operations for burst preloading for available bandwidth estimation. As an alternative or in addition to retrieving and executing instructions, hardware processor 612 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 614, may be any electronic, magnetic, optical, or other physical storage device that contains or stores executable instructions. Thus, machine-readable storage medium 614 may be, for example, Random Access Memory (RAM), non-volatile RAM (NVRAM), an Electrically Erasable Programmable Read-Only Memory (EEPROM), a storage device, an optical disc, and the like. In some examples, machine-readable storage medium 614 may be a non-transitory storage medium, where the term "non-transitory" does not encompass transitory propagating signals. As described in detail below, machine-readable storage medium 614 may be encoded with executable instructions, for example, instructions 616-620. In various examples, the instructions may be performed dynamically.

As described above, computer system 600 may be used to implement a cloud-based data analytics service (e.g. an AIOps service). Accordingly, hardware processor 612 may execute instruction 616 to cause the cloud-based data analytics service to receive customer sensor data associated with one or more systems of one or more customers. This customer sensor data may be received from an intermediate data transport layer which connects the cloud-based analytics service to multiple customers while maintaining data isolation between the customers.

Customer sensor data may comprise data associated with the operation of a customer's system or systems, including the operation of sensors within the system(s). A customer's systems may include the connected devices and infrastructure systems of the customer (these customer systems may include hardware and software systems). Accordingly, an example of customer sensor data may include data associated with the coolant flow rate for a customer's coolant distribution unit.

As described in conjunction with FIGS. 1-5, the intermediate data transport layer may be a bidirectional data transport layer which connects multiple customers to one or more cloud-based data analytics services, while maintaining data isolation between the customers. This intermediate data transport layer can be a layered communication platform such as HPE's Remote Device Access platform (RDA). In various examples, this layered communication platform may use "Midway Servers" ("midways") and data transport "tunnels" to establish secure pipelines between customers and the cloud-based data analytics services. A midway may refer to a piece of computer software or hardware which can join a first data transport tunnel which leads to a customer, to a second data transport tunnel which leads to the cloud-based data analytics service. In this way, the midway may establish a secure, dedicated pipeline between the customer and the cloud-based data analytics service.

As described above, a data transport tunnel may be secured in a variety of ways. For example, the data transport tunnel may require: (1) multiple forms of mutual authentication (e.g. via TLS, ssh, or IPsec); (2) authorization via an access control mechanism; and (3) use of encrypted communications to prevent tampering and eavesdropping (for example numeric-field-orthogonal encryption methods may be employed to improve resiliency to decryptor attacks). Additional mechanisms (e.g. the maintenance of security keys, tokens, and certificates) may also be used for security.

As described in conjunction with FIG. 4, a session may refer to the joining, at a midway, of a first tunnel which leads to a customer with a second tunnel which leads to a cloud-based data analytics service. To establish a session, a session client (e.g. a particular customer) may first connect to a midway by establishing/authorizing/authenticating a tunnel to that midway. Once the tunnel is established/authorized/authenticated (e.g. by verifying the customer's unique identifier/station ID), the customer may send a start session request to the midway. In response to the start session request, the midway may perform a first authorization check by checking a session-level access control mechanism. This session-level access control mechanism may consider any number of factors, such as the session client (e.g. the customer), the destination (e.g. the cloud-based data analytics service), and the activity to be performed (sending customer sensor data to the cloud-based data analytics service). For example, a midway's authorization check may verify that the customer requesting a session is subscribed to the cloud-based data analytics service.

If the midway's authorization check is allowed, the midway may send a message down a tunnel to the cloud-based data analytics service requesting that the session be established. The cloud-based data analytics service may perform a second authorization check of the session request. This authorization check may verify that the customer is a customer that the cloud-based data analytics service knows and trusts, that the connection is in a permitted time window, and that the customer subscribes to the cloud-based data analytics service.

If both the midway and AIOps-side authorization checks pass, then the end-to-end session may be established. All these actions may happen automatically and transparently.

As described in conjunction with FIG. 4, this process may be reversed. For example, as will be described in conjunction with instruction 620, the cloud-based data analytics service may modify the operation of one or more customer systems via the intermediate data transport layer by establishing a session with the customer whose system(s) are being modified, or with the customer systems themselves. In this reverse example, similar authorization checks may be performed to authorize each side of the session.

As described in conjunction with FIG. 5, in various examples, the intermediate data transport layer may utilize a publish/subscribe message bus communications link between a midway and the cloud-based data analytics service. A publish/subscribe message bus communications link may refer to a communication system/link which allows a sender of messages (i.e. a publisher) to publish messages to one or more topics which a data consumer is subscribed to read/consume. Accordingly, via the midway and this publish/subscribe message bus communications link, a customer (or its systems) may publish messages to the cloud-based data analytics service on certain topics (e.g. sensor data topics), which the cloud-based data analytics service may be pre-subscribed to consume/receive. These messages may be visible to the cloud-based data analytics service only. Via this link and the midway, the cloud-based data analytics service may also publish messages back to the customer on certain topics (e.g. notifications and operational modification topics) which the customer (or its systems) may be pre-subscribed to consume.

Hardware processor 612 may execute instruction 618 to cause the cloud-based data analytics service to analyze the customer sensor data.

This analysis may be performed in a number of ways, and for various purposes. For example, the analysis performed by the cloud-based analytics service on the customer sensor data may comprise detecting anomalies in customer system operation, performing root cause analyses, optimizing certain tasks/customer systems, predicting failures in customer systems, predicting that a customer system will hit certain capacity limits, and other types of analyses.

In certain examples, the cloud-based analytics service may use one or more trained machine learning models to perform data analysis. These machine learning models may be trained using historical data extracted from one or more customers. This historical data may relate to past operation of customer systems. For example, the historical data may include information associated with past raw metrics/sensor data, prior detected anomalies, prior root cause analyses, information associated with the optimization of certain tasks/customer systems, prior notifications, prior operational modifications made in response to various analytical insights, etc. In other examples, these machine learning models may be trained using live/real-time customer data.

In certain examples, the cloud-based analytics service may select one of a plurality of trained machine learning models depending on various factors such as the type of data being analyzed and the type of analysis being performed.

For illustration, the cloud-based analytics service may be dedicated to anomaly detection. Even for this single type of analysis, the cloud-based analytics service may utilize a number of different trained machine learning models. As described above, the cloud-based analytics service may utilize separate machine learning models for detecting operational anomalies for various types of customer systems. Even when analyzing a particular customer system (e.g. a customer's coolant distribution unit), the cloud-based analytics service may utilize separate machine learning models trained to detect anomalies for different operational parameters (e.g. coolant temperature, coolant flow rate, the relationship between coolant temperature and coolant flow rate, etc.). In another example, the cloud-based analytics service may utilize machine learning models trained for different operational contexts. For example, the cloud-based analytics service may utilize separate machine learning models based on climate (e.g. hot and dry vs. cool and wet), or operational loads (e.g. high vs. low, constant vs. intermittent, etc.).

As described above, the cloud-based analytics service may use one or more trained machine learning models to perform various types of analysis on customer sensor data from one or more customers (e.g. anomaly detection, root cause analyses, optimization of tasks/conditions, etc.). In response to this analysis, the cloud-based analytics service may determine that an operational modification is required.

Hardware processor 612 may execute instruction 620 to cause the cloud-based data analytics service to modify the operation of one or more of the customer systems in response to the analysis performed during instruction 618. This modification may be to either or both of a customer's software and hardware systems.

In certain examples, this modification may be done via the intermediate data transport layer. For example, as described in conjunction with instruction 616, the cloud-based data analytics service may modify the operation of one or more customer systems via the intermediate data transport layer by establishing a session with the customer whose system(s) are being modified, or with the customer systems themselves.

In certain examples, the cloud-based data analytics service may modify the operation of a customer system by publishing one or more messages to an operational modification topic which the customer system (or some operational controller of the customer) is pre-subscribed to consume.

As described above, the cloud-based data analytics service may modify the systems of multiple customers in response to an analytical insight derived from a single customer's data. This may be the case when an analytical insight is relevant to more customers than the single customer whose data the insight was derived from. For example, the cloud-based data analytics service may find a sub-optimal condition for a temperature sensor on a coolant distribution unit while analyzing a first customer's data. A second customer may have the same make/model coolant distribution unit, with the same sub-optimal temperature sensor condition (which may not have been discovered/identified by the cloud-based data analytics service). Here, because the analytical insight is relevant to both customers, the cloud-based data analytics service may modify the operation of coolant distribution units at both customer sites based on the insight.

Figure 7:
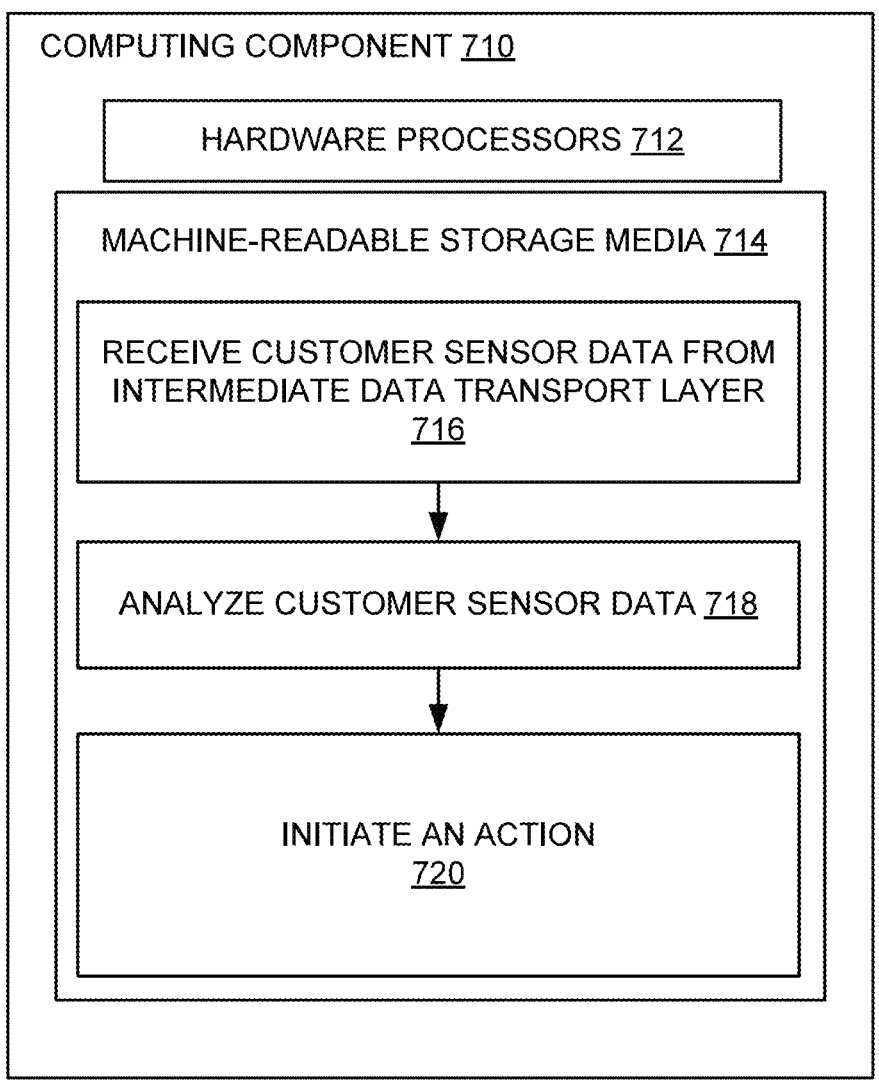
FIG. 7 is another example computing system that may be used to implement a cloud-based AIOps service, in accordance with various examples.

FIG. 7 is another example computing system that may be used to implement a cloud-based AIOps service, in accordance with various examples.

Referring now to FIG. 7, computing component 710 may be, for example, a server computer, a controller, or any other similar computing component capable of processing data. In the example implementation of FIG. 7, the computing component 710 includes a hardware processor 712, and machine-readable storage medium for 714.

Hardware processor 712 and machine-readable storage medium 714 may be the same/similar as hardware processor 612 and machine-readable storage medium 614 respectively. Accordingly, machine-readable storage medium 714 may be encoded with executable instructions, for example, instructions 716-720. In various examples, the instructions may be performed dynamically.

Computer system 700 may be used to implement a cloud-based data analytics service (e.g. an AIOps service). Accordingly, hardware processor 712 may execute instruction 716 to cause the cloud-based data analytics service to receive customer sensor data from one or more systems of one or more customers. This customer sensor data may be received from an intermediate data transport layer which connects the cloud-based analytics service to multiple customers while maintaining data isolation between the customers. This instruction may the same/similar as that described in conjunction with instruction 616.

Hardware processor 712 may execute instruction 718 to cause the cloud-based data analytics service to analyze the customer sensor data. This instruction may be the same/similar as that described in conjunction with instruction 718.

Hardware processor 712 may execute instruction 720 to cause the cloud-based data analytics service to initiate an action in response to the data analysis performed in conjunction with instruction 718.

Here, initiating an action may comprise any number of things, including but not limited to, modifying the operation of one or more customer systems; providing a notification related to one or more of the customer systems to one or more of the customers; and triggering a field replacement of parts for one or more of the customer systems.

The cloud-based data analytics service may modify the operation of one or more of the customer systems in the same/similar manner as described in conjunction with instruction 620.

As described above, a notification may provide information about an operational condition of a customer system that was analyzed during execution of instruction 718. For example, a first notification may provide information about a detected anomalous operation of a temperature sensor in a customer's coolant distribution unit. A second notification may provide information about a predicted failure of an electrical winding in another customer's electrical generators. In response to a prediction that a given customer system will reach a capacity limit by a certain date, a third notification may provide a recommendation that various resources used by the given customer system (e.g. memory, computer cores, disk space, network bandwidth, etc.) must be increased by a certain date.

The cloud-based data analytics service may provide the notification via the intermediate data transport layer by establishing a session with the customer who is being notified.

In certain examples, the cloud-based data analytics service may provide a notification to a customer by publishing one or more messages to a notification topic which the customer is pre-subscribed to consume. In certain examples, a customer may have a dashboard which is pre-subscribed to consume messages published to the notification topic. In this way, personnel at each customer's site may be able to view notifications generated in response to the real-time analytical insights of the cloud-based analytics service.

As described above, the cloud-based data analytics service may provide a notification to multiple customers in response to an analytical insight derived from a single customer's data. This may be the case when an analytical insight is relevant to more customers than the single customer whose data the insight was derived from. For example, the cloud-based data analytics service may find an anomalous temperature sensor operation in a coolant distribution unit while analyzing a first customer's data. A second customer may have the same make/model coolant distribution unit (which may or may not have the same anomalous temperature sensor operation). Here, because the analytical insight may be relevant to both customers (even if preventative for the second customer), the cloud-based data analytics service may provide a notification to both customer sites based on the insight.

Triggering a field replacement of parts for one or more of the customer systems may take many forms. For example, in response to a prediction that a temperature sensor in a customer's coolant distribution unit will fail within a month, the cloud-based data analytics service may schedule a replacement technician to replace the temperature sensor at the customer's site within the week. Similarly, the cloud-based data analytics service may order replacement parts for the customer, and/or schedule deliveries to the customer's premises.

Figure 8:
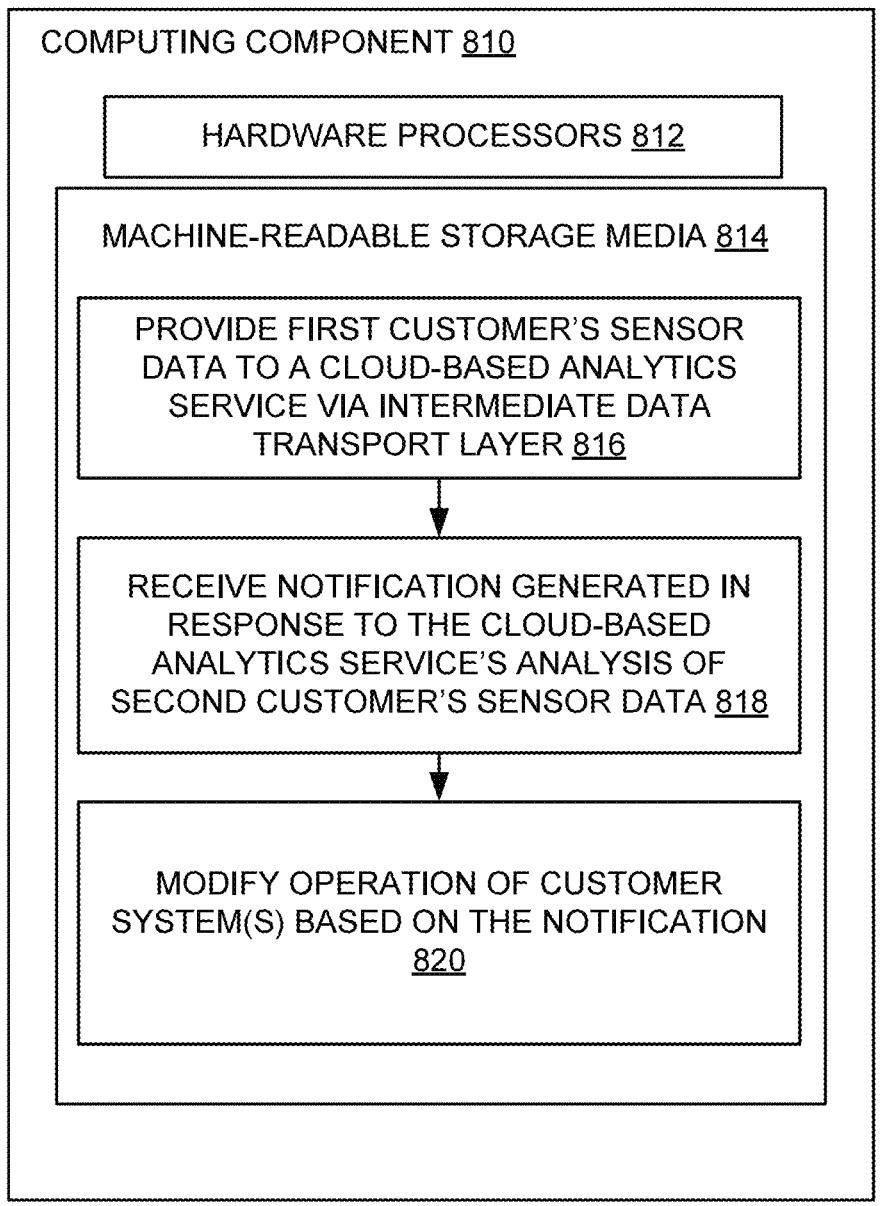
FIG. 8 is an example computing system that may be used engage with a cloud-based AIOps service, in accordance with various examples.

FIG. 8 is an example computing system that may be used to engage a cloud-based AIOps service, in accordance with various examples. In certain examples, the example computing system 800 may be a computing system of a first customer of a cloud-based data analytics service.

Referring now to FIG. 8, computing component 810 may be, for example, a server computer, a controller, or any other similar computing component capable of processing data. In the example implementation of FIG. 8, the computing component 810 includes a hardware processor 812, and machine-readable storage medium for 814.

Hardware processor 812 and machine-readable storage medium 814 may be the same/similar as hardware processor 612 and machine-readable storage medium 614 respectively. Accordingly, machine-readable storage medium 814 may be encoded with executable instructions, for example, instructions 816-820. In various examples, the instructions may be performed dynamically.

Hardware processor 812 may execute instruction 816 to provide the first customer's sensor data to a cloud-based data analytics service via an intermediate data transport layer. The first customer's sensor data may be data associated with one or more of the first customer's systems.

Here, the first customer's sensor data and the intermediate data transport layer may be the same/similar as described in conjunction with the preceding figures. Accordingly, hardware processor 812 may provide the first customer's sensor data to the cloud-based data analytics service via the intermediate data transport layer in the same/similar manner as described in conjunction with those figures.

Hardware processor 812 may execute instruction 818 to receive from the cloud-based data analytics service, via the intermediate data transport layer, a notification generated in response to the cloud-based data analytics service's analysis of a second customer's sensor data. Here, the notification and the intermediate data transport layer may be the same/similar as described in conjunction with the preceding figures. Accordingly, hardware processor 812 may receive the notification from the cloud-based data analytics service via the intermediate data transport layer in the same/similar manner as described in conjunction with those figures.

Here, computing system 800 is associated with the first customer (and not the second customer). However, the notification hardware processor 812 receives has been generated in response to the cloud-based data analytics service's analysis of a second customer's data. One extraordinary benefit of systems/architectures like those described above are that they can facilitate the sharing of insights among an enormous customer base, all while maintaining each customer's data isolated from other customers. For example, a first customer located in San Diego, CA may benefit immediately (or close to immediately) from an insight derived from analyzing data from a second customer's machine located in Melbourne, AU.

Hardware processor 812 may execute instruction 820 to modify the operation of one or more of the first customer's systems based on the notification. This may be accomplished in any number of ways. For example, a notification may relate to an anomalous operation of a temperature sensor in one of the second customer's coolant distribution units. The notification may include information about the anomalous operation, such as a set of instructions which may be used to verify if a temperature sensor on one of the first customer's coolant distribution units is exhibiting the same/similar anomalous operation. The notification may also include a set of instructions on how to modify the operation of the coolant distribution unit and/or temperature sensor in order to fix the issue. Accordingly, hardware processor 812 may follow these instructions to determine whether an operational modification is needed, and if so, perform the operational modification.

Figure 9:
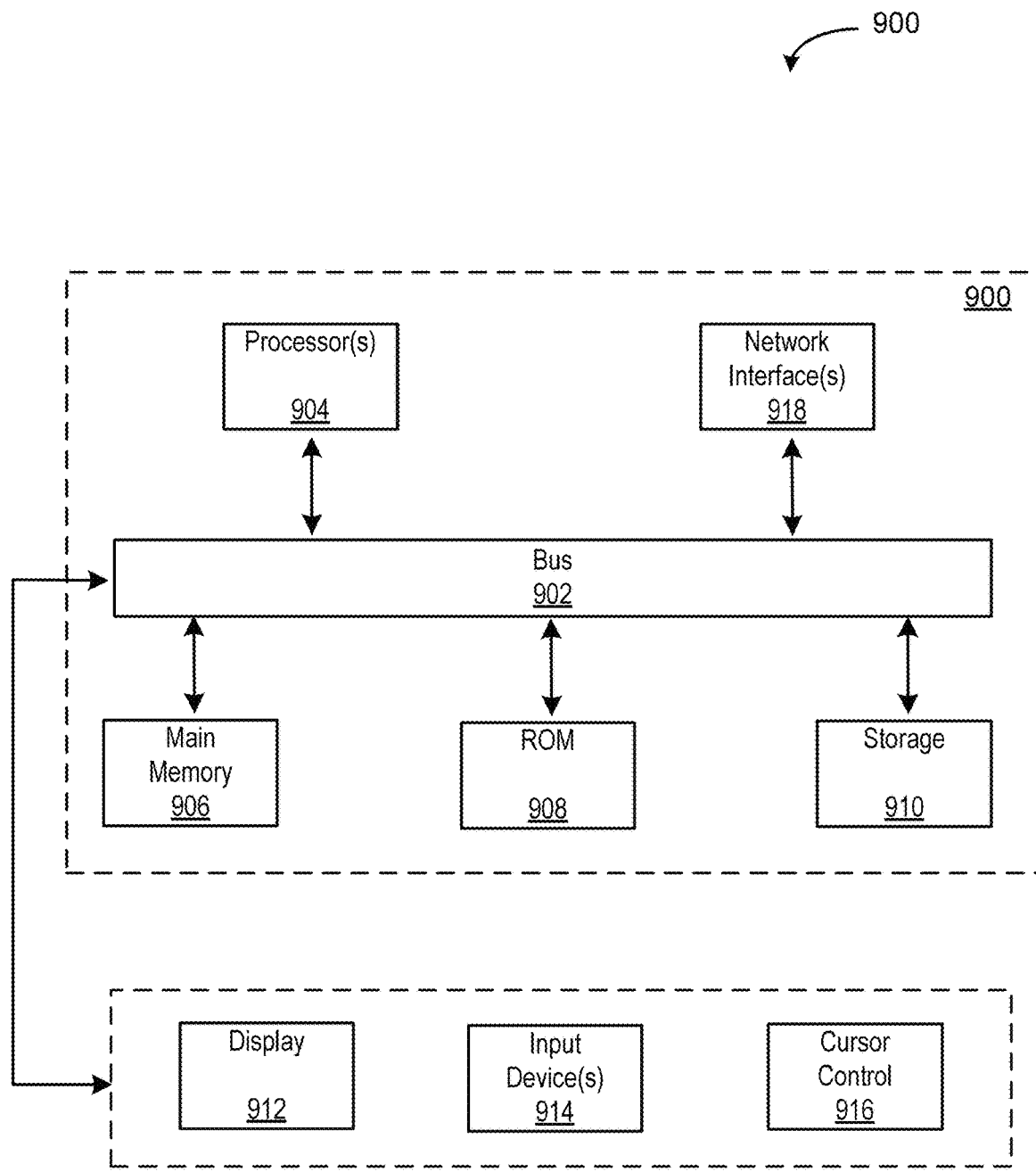
FIG. 9 depicts a block diagram of an example computer system 900 in which various of the embodiments described herein may be implemented The figures are not exhaustive and do not limit the present disclosure to the precise form disclosed.

FIG. 9 depicts a block diagram of an example computer system 900 in which various of the examples described herein may be implemented. The computer system 900 includes a bus 902 or other communication mechanism for communicating information, one or more hardware processors 904 coupled with bus 902 for processing information. Hardware processor(s) 904 may be, for example, one or more general purpose microprocessors.

The computer system 900 also includes a main memory 906, such as a random access memory (RAM), cache and/or other dynamic storage devices, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions.

The computer system 900 further includes a read only memory (ROM) 908 or other static storage device coupled to bus 902 for storing static information and instructions for processor 904. A storage device 910, such as a magnetic disk, optical disk, or USB thumb drive (Flash drive), etc., is provided and coupled to bus 902 for storing information and instructions.

The computer system 900 may be coupled via bus 902 to a display 912, such as a liquid crystal display (LCD) (or touch screen), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. In some examples, the same direction information and command selections as cursor control may be implemented via receiving touches on a touch screen without a cursor.

The computing system 900 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 900 may implement the techniques described herein using customized hard-wired logic, one or more ASICs or FPGAs, firmware and/or program logic which in combination with the computer system causes or programs computer system 900 to be a special-purpose machine. According to one example, the techniques herein are performed by computer system 900 in response to processor(s) 904 executing one or more sequences of one or more instructions contained in main memory 906. Such instructions may be read into main memory 906 from another storage medium, such as storage device 910. Execution of the sequences of instructions contained in main memory 906 causes processor(s) 904 to perform the process steps described herein. In alternative examples, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 910. Volatile media includes dynamic memory, such as main memory 906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 902. Transmission media can also take the form of acoustic or light waves, such as those generated during radio-wave and infra-red data communications.

The computer system 900 also includes a communication interface 918 coupled to bus 902. Network interface 918 provides a two-way data communication coupling to one or more network links that are connected to one or more local networks. For example, communication interface 918 may be an integrated services digital network (ISDN) card, cable modem, satellite modem, or a modem to provide a data communication connection to a corresponding type of telephone line. As another example, network interface 918 may be a local area network (LAN) card to provide a data communication connection to a compatible LAN (or WAN component to communicated with a WAN). Wireless links may also be implemented. In any such implementation, network interface 918 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 918, which carry the digital data to and from computer system 900, are example forms of transmission media.

The computer system 900 can send messages and receive data, including program code, through the network(s), network link and communication interface 918. In the Internet example, a server might transmit a requested code for an application program through the Internet, the ISP, the local network and the communication interface 918.

The received code may be executed by processor 904 as it is received, and/or stored in storage device 910, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example examples. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 900.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain examples include, while other examples do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A computer-implemented method comprising:
responsive to a first data transport tunnel between a first customer computer system and a midway of an intermediate data transport layer being established, establishing, by a cloud-based data analytics service, a second data transport tunnel from the cloud-based data analytics service to the midway,
the midway comprising computer hardware or software operating as a switchboard joining the first data transport tunnel with the first customer computer system and the second data transport tunnel with the cloud-based data analytics service;
accessing, by the midway, a publish/subscribe message bus between the first computer system, the midway, and the cloud-based data analytics service for enabling communication between the cloud-based data analytics service and the first customer computer system;
receiving, by the publish/subscribe message bus, a published message from the first computer system, and delivering, by the publish/subscribe message bus, the published message to the cloud-based data analytics service;
responsive to the intermediate data transport layer joining the first data transport tunnel and the second data transport tunnel at the midway and establishing the publish/subscribe message bus, receiving, by the cloud-based data analytics service, sensor data from the first customer computer system via the first data transport tunnel and the second data transport tunnel;
generating, by the cloud-based data analytics service, sensor data insight from the sensor data;
in response to generating the sensor data insight, transmitting in near real-time, by the cloud-based data analytics service and via the publish/subscribe message bus, the sensor data insight to a second customer computer system absent providing the sensor data from the first customer computer system to the second customer computer system; and
based on the sensor data insight, initiating one or more actions for optimizing the second customer computer system or making changes to the second customer computer system.

2. The computer-implemented method of claim 1, wherein the midway is a first midway, and wherein initiating the one or more actions comprises:
establishing, by the cloud-based data analytics service, a third data transport tunnel from the cloud-based data analytics service to a second midway of the intermediate data transport layer;
sending, by the cloud-based data analytics service to the second midway, a request to initiate a session with the second customer computer system; and
responsive to a fourth data transport tunnel from the second customer computer system to the second midway being established and joined with the third data transport tunnel at the second midway, initiating, by the cloud-based data analytics service, at least one of the following actions via the joined third and fourth data transport tunnels:
modifying operation of one or more systems of the second customer computer system,
providing a notification related to one or more of the systems of the second customer computer system, and
triggering a field replacement of parts for one or more of the systems of the second customer computer system.

3. The computer-implemented method of claim 2, wherein the intermediate data transport layer comprises a publish/subscribe message bus communications link.

4. The computer-implemented method of claim 3, wherein modifying the operation of a given system of the customer comprises:
publishing, by the cloud-based data analytics service, via the publish/subscribe message bus communications link, an operational modification message to an operational modification topic which the first customer computer system subscribes to.

5. The computer-implemented method of claim 3, wherein providing a notification to the first customer computer system comprises:
publishing, by the cloud-based data analytics service, via the publish/subscribe message bus communications link, a notification message to a notification topic which a dashboard located on premises of the first customer computer system subscribes to.

6. The computer-implemented method of claim 2, wherein the first and second midways comprise a same midway.

7. The computer-implemented method of claim 1, wherein:
joining, at the midway, the first data transport tunnel leading to the customer to the second data transport tunnel leading to the cloud-based data analytics service establishes a session between the customer and the cloud-based data analytics service; and
before being established, the session must be authorized by the midway and at least one of the cloud-based data analytics service and the customer.

8. The computer-implemented method of claim 7, wherein the first data transport tunnel leading to the customer cannot be joined with a data transport tunnel leading to another customer.

9. The computer-implemented method of claim 1 wherein analyzing the sensor data comprises at least one of the following:
detecting anomalies;
predicting failures;
predicting capacity limits;
conducting root cause analyses; and
optimizing the first customer computer system.

10. The computer-implemented method of claim 2, wherein the first and second midways comprise the different midways.

11. The computer-implemented method of claim 1, wherein the intermediate data transport layer connects the cloud-based analytics service to multiple customer computer systems while maintaining data isolation among the multiple customer computer systems.

12. The computer-implemented method of claim 1, further comprising:
prior to establishing the second data transport tunnel, determining a session-level access control of the first customer computer system comprising a session client/source station, a destination station, and activity to be performed; and
prior to establishing the second data transport tunnel, determining a subscription status of the first customer computer system in subscribing to the sensor data insight from the cloud-based data analytics service.

13. A cloud-based data analytics system comprising:
at least one processor; and
memory storing instructions that, when executed by the at least one processor, cause the cloud-based data analytics system to perform a method comprising:
responsive to a first data transport tunnel between a first customer computer system and a first midway of an intermediate data transport layer being established, establishing a second data transport tunnel from the cloud-based data analytics system to the first midway,
the midway comprising computer hardware or software operating as a switchboard joining the first data transport tunnel with the first customer computer system and the second data transport tunnel with the cloud-based data analytics system;
accessing, by the first midway, a publish/subscribe message bus between the first computer system, the first midway, and the cloud-based data analytics system for enabling communication between the cloud-based data analytics system and the first customer computer system;
receiving, by the publish/subscribe message bus, a published message from the first computer system, and delivering, by the publish/subscribe message bus, the published message to the cloud-based data analytics system;
responsive to the intermediate data transport layer joining the first data transport tunnel and the second data transport tunnel at the first midway and establishing the publish/subscribe message bus, receiving sensor data from the first customer computer system via the first data transport tunnel and the second data transport tunnel;
generating sensor data insight from the sensor data;
in response to generation of the sensor data:
establishing a third data transport tunnel from the cloud-based data analytics system to a second midway of the intermediate data transport layer;

sending a request to initiate a session with the first customer computer system; and responsive to a fourth data transport tunnel from the first customer computer system to the second midway being established and joined with the third data transport tunnel at the second midway, modifying operation of a system of the first customer computer system via the joined third and fourth data transport tunnels based on the sensor data insight, initiating one or more actions for optimizing a second customer computer system or making changes to the second customer computer system.

14. The cloud-based data analytics system of claim 13, wherein the first and second midways comprise a same midway.

15. The cloud-based data analytics system of claim 13, wherein:

joining, at the first midway, the first data transport tunnel leading to the first customer computer system to the second data transport tunnel leading to the cloud-based data analytics system establishes a session between the first customer computer system and the cloud-based data analytics system; and before being established, the session must be authorized by the first midway and at least one of the cloud-based data analytics system and the first customer computer system.

16. The cloud-based data analytics system of claim 15, wherein the first data transport tunnel leading to the first customer computer system cannot be joined with a data transport tunnel leading to another customer computer system.

17. The cloud-based data analytics system of claim 16, wherein the intermediate data transport layer comprises a publish/subscribe message bus communications link.

18. The cloud-based data analytics system of claim 17, wherein modifying the operation of the first customer computer system comprises:

publishing, via the publish/subscribe message bus communications link, an operational modification message to an operational modification topic which the system of the first customer computer system subscribes to.

19. The cloud-based data analytics system of claim 13, wherein the first and second midways comprise different midways.

20. Non-transitory computer-readable storage medium including instructions that, when executed by at least one processor of a computing system, cause the computing system to perform a method comprising:

establishing a first data transport tunnel from a first customer computer system to a midway of an intermediate data transport layer, the midway comprising computer hardware or software operating as a switchboard joining the first data transport tunnel with the first customer computer system and a second data transport tunnel with a cloud-based data analytics service;

sending, to the midway, a request to initiate a session with the cloud-based data analytics service;

accessing, by the midway, a publish/subscribe message bus between the first computer system, the midway, and the cloud-based data analytics service for enabling communication between the cloud-based data analytics service and the first customer computer system;

receiving, by the publish/subscribe message bus, a published message from the first computer system, and delivering, by the publish/subscribe message bus, the published message to the cloud-based data analytics service;

responsive to the second data transport tunnel from the cloud-based data analytics service to the midway being established and joined with the first data transport tunnel at the midway and establishing the publish/subscribe message bus, providing a sensor data to the cloud-based data analytics service via the joined first data transport tunnel and the second data transport tunnel;

generating sensor data insight from the sensor data;

in response to generating the sensor data insight, transmitting in near real-time, via the publish/subscribe message bus, the sensor data insight to a second customer computer system absent providing the sensor data from the first customer computer system to the second customer computer system; and based on the sensor data insight, initiating one or more actions for optimizing the second customer computer system or making changes to the second customer computer system.

21. The non-transitory computer-readable storage medium of claim 20, wherein the intermediate data transport layer connects the cloud-based analytics service to multiple customer computer systems while maintaining data isolation among the multiple customer computer systems.

* * * * *